US012067272B2

(12) United States Patent
Chung

(10) Patent No.: US 12,067,272 B2
(45) Date of Patent: Aug. 20, 2024

(54) STORAGE DEVICE AND POWER MANAGEMENT METHOD THEREOF

(71) Applicant: SK hynix Inc., Icheon-si (KR)

(72) Inventor: Seung Hyun Chung, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 51 days.

(21) Appl. No.: 17/576,660

(22) Filed: Jan. 14, 2022

(65) Prior Publication Data

US 2023/0058022 A1 Feb. 23, 2023

(30) Foreign Application Priority Data

Aug. 18, 2021 (KR) ........................ 10-2021-0109094

(51) Int. Cl.
*G06F 3/06* (2006.01)

(52) U.S. Cl.
CPC .......... *G06F 3/0634* (2013.01); *G06F 3/0604* (2013.01); *G06F 3/0625* (2013.01); *G06F 3/0652* (2013.01); *G06F 3/0679* (2013.01)

(58) Field of Classification Search
CPC .... G06F 3/0659; G06F 3/0604; G06F 3/0625; G06F 3/0634; G06F 3/0679; G06F 3/0688; G06F 3/0683; G06F 3/0658; G06F 3/0653; G06F 12/0246; G06F 2212/7208; G06F 2212/7206; G06F 2212/1028
See application file for complete search history.

(56) References Cited

U.S. PATENT DOCUMENTS 9,093,160 B1 * 7/2015 Ellis ........................ G11C 16/32
2015/0235677 A1 * 8/2015 Grunzke .................. G11C 5/04 365/226
2016/0077961 A1 * 3/2016 Erez .................... G06F 12/0246 711/103
2021/0405920 A1 * 12/2021 Lien ...................... G06F 3/0679

FOREIGN PATENT DOCUMENTS

KR 1020180106017 A 10/2018
KR 1020190052884 A 5/2019
KR 1020200015190 A 2/2020

* cited by examiner

*Primary Examiner* — Curtis James Kortman
(74) *Attorney, Agent, or Firm* — William Park & Associates Ltd.

(57) ABSTRACT

A storage device, and a method of operating the storage device, includes a plurality of memory devices configured to store peak power information including information about a plurality of peak power periods and information about IDs respectively corresponding to the plurality of peak power periods. The storage device also includes a memory controller configured to assign an ID to each of the plurality of memory devices and control the memory devices so that one or more memory devices having an identical ID corresponding to a target period, among the plurality of peak power periods, perform a memory operation at peak power.

8 Claims, 17 Drawing Sheets

FIG. 5A

| MEMORY DEVICE | ID |
|---|---|
| MEMORY DEVICE 1 | ID1 |
| MEMORY DEVICE 2 | ID2 |
| MEMORY DEVICE 3 | ID3 |
| MEMORY DEVICE 4 | ID4 |

| | Peak Operation Period | | | | | | | |
|---|---|---|---|---|---|---|---|---|
| | P1 | P2 | P3 | P4 | P5 | P6 | P7 | P8 |
| ID1 | O | | | | O | | | |
| ID2 | | O | | | | O | | |
| ID3 | | | O | | | | O | |
| ID4 | | | | O | | | | O |

FIG. 5B

| | Peak Operation Period | | | | | | | |
|---|---|---|---|---|---|---|---|---|
| | P1 | P2 | P3 | P4 | P5 | P6 | P7 | P8 |
| ID1 | O | | | | | | | O |
| ID2 | | O | | | | | O | |
| ID3 | | | O | | | O | | |
| ID4 | | | | O | O | | | |

| MEMORY DEVICE | ID |
|---|---|
| MEMORY DEVICE 1 | ID1 |
| MEMORY DEVICE 2 | ID2 |
| MEMORY DEVICE 3 | ID3 |
| MEMORY DEVICE 4 | ID4 |

FIG. 5C

| | Peak Operation Period | | | | | |
|---|---|---|---|---|---|---|
| | P1 | P2 | P3 | P4 | P5 | P6 |
| ID1 | O | | O | O | | |
| ID2 | | O | | | O | O |

| MEMORY DEVICE | ID |
|---|---|
| MEMORY DEVICE 1 | ID1 |
| MEMORY DEVICE 2 | ID1 |
| MEMORY DEVICE 3 | ID2 |
| MEMORY DEVICE 4 | ID2 |

STORAGE DEVICE AND POWER MANAGEMENT METHOD THEREOF

CROSS-REFERENCE TO RELATED APPLICATION

The present application claims priority under 35 U.S.C. § 119(a) to Korean patent application number 10-2021-0109094, filed on Aug. 18, 2021, in the Korean Intellectual Property Office, the entire disclosure of which is incorporated herein by reference.

BACKGROUND

1. Technical Field

Various embodiments of the present disclosure generally relate to an electronic device, and more particularly to a storage device and a power management method of the storage device.

2. Related Art

A storage device is a device which stores data under the control of a host device, such as a computer or a smartphone. The storage device may include a memory device in which data is stored and a memory controller which controls the memory device. Such memory devices are classified as volatile memory devices or nonvolatile memory devices.

A volatile memory device is a memory device in which data is stored only when power is supplied and in which stored data is lost when the supply of power is interrupted. Volatile memory devices use, for example, Static Random Access Memory (SRAM) and Dynamic Random Access Memory (DRAM).

A nonvolatile memory device is a memory device in which stored data is retained even when the supply of power is interrupted. Nonvolatile memory devices use, for example, Read Only Memory (ROM), Programmable ROM (PROM), Electrically Programmable ROM (EPROM), Electrically Erasable and Programmable ROM (EEPROM), and flash memory.

SUMMARY

Various embodiments of the present disclosure are directed to a storage device having efficient power management performance and a method of operating the storage device.

An embodiment of the present disclosure may provide for a storage device. The storage device may include a plurality of memory devices configured to store peak power information including information about a plurality of peak power periods and information about IDs respectively corresponding to the plurality of peak power periods. The storage device may also include a memory controller configured to assign an ID to each of the plurality of memory devices and control the memory devices so that one or more memory devices having an identical ID corresponding to a target period, among the plurality of peak power periods, perform a memory operation at peak power.

An embodiment of the present disclosure may provide for a memory device that includes a plurality of memory cells and a peripheral circuit configured to perform a memory operation on the plurality of memory cells. The memory device also includes a power management information storage configured to store peak power information including information about a plurality of peak power periods and information about IDs respectively corresponding to the plurality of peak power periods. The memory device further includes an operation processor configured to control the peripheral circuit so that the memory operation is performed at peak power during a target period corresponding to an ID assigned to the memory device, among the plurality of peak power periods.

An embodiment of the present disclosure may provide for a method of operating a memory device. The method may include receiving, from a memory controller, a peak power setting command for setting peak power information, wherein the peak power information includes information about a plurality of peak power periods and information about IDs respectively corresponding to the plurality of peak power periods. The method may also include storing the peak power information, storing the ID information in response to an ID assignment command received from the memory controller, and receiving a memory operation command from the memory controller. The method may further include performing a memory operation at the peak power during a target period corresponding to an assigned ID indicated by the ID information, among the plurality of peak power periods, in response to the memory operation command.

BRIEF DESCRIPTION OF THE DRAWINGS

FIG. 5A is a diagram illustrating peak power information and ID information according to an embodiment of the present disclosure.

FIG. 5B is a diagram illustrating peak power information and ID information according to an embodiment of the present disclosure.

FIG. 5C is a diagram illustrating peak power information and ID information according to an embodiment of the present disclosure.

DETAILED DESCRIPTION

Specific structural or functional descriptions in the embodiments of the present disclosure introduced in this specification or application are exemplified to describe embodiments according to the concept of the present disclosure. The embodiments according to the concept of the present disclosure may be practiced in various forms, and should not be construed as being limited to the embodiments described in the specification or application.

Hereinafter, the present disclosure will be described in detail based on embodiments of the present disclosure with reference to the accompanying drawings. Below, embodiments of the present disclosure will be described in detail with reference to the attached drawings.

Figure 1:
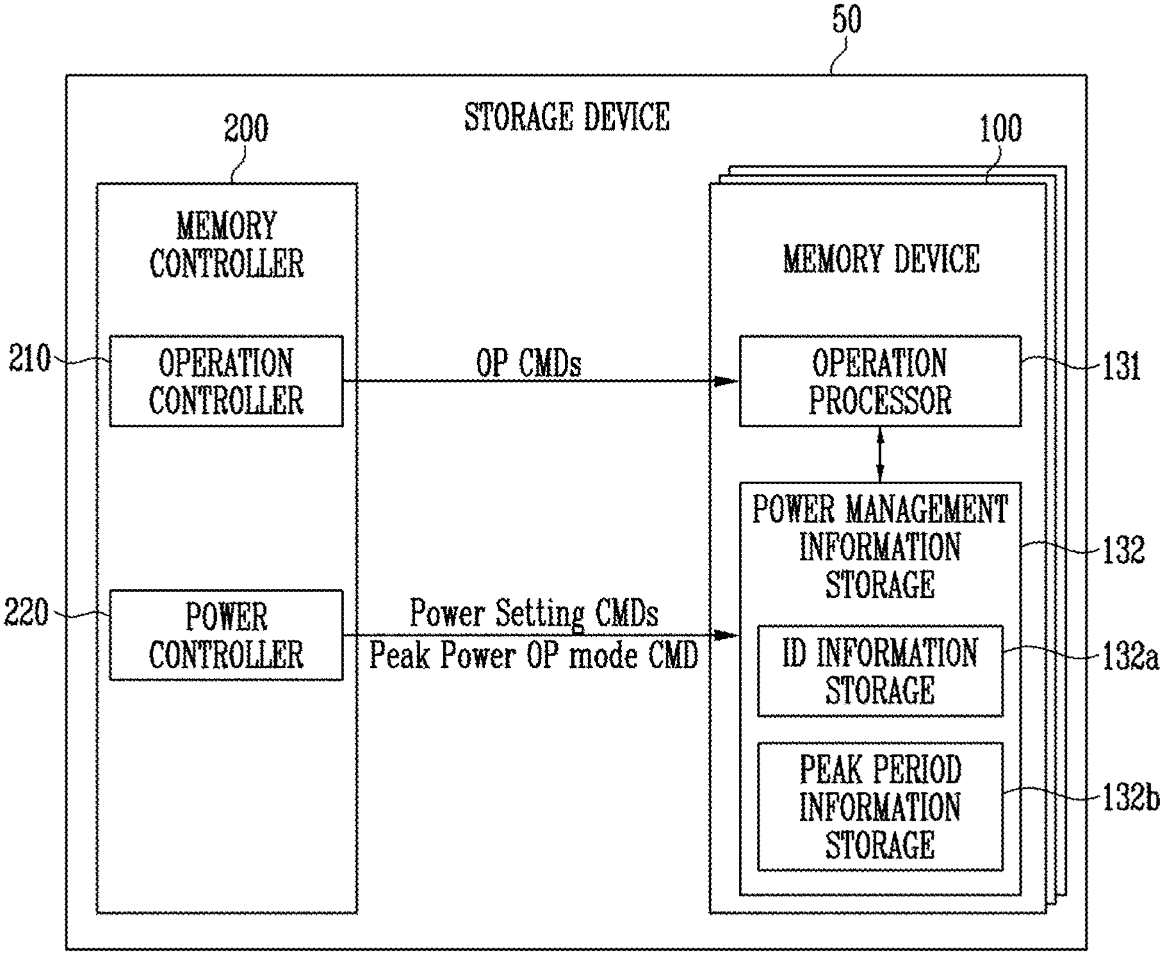
FIG. 1 is a diagram illustrating a storage device according to an embodiment of the present disclosure.

FIG. 1 is a diagram illustrating a storage device according to an embodiment of the present disclosure.

Referring to FIG. 1, a storage device 50 may include memory devices 100 and a memory controller 200 which controls the operations of the memory devices 100. The storage device 50 may be a device which stores data under the control of a host, such as a mobile phone, a smartphone, an MP3 player, a laptop computer, a desktop computer, a game console, a television (TV), a tablet personal computer (PC), or an in-vehicle infotainment system.

The storage device 50 may be manufactured as any one of various types of storage devices depending on a host interface that is a scheme for communication with the host. For example, the storage device 50 may be implemented as any one of various types of storage devices, for example, a solid state drive (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be manufactured in any one of various types of package forms. For example, the storage device 50 may be manufactured in any one of various types of package forms, such as package on package (POP), system in package (SIP), system on chip (SOC), multi-chip package (MCP), chip on board (COB), wafer-level fabricated package (WFP), and wafer-level stack package (WSP).

Each memory device 100 may store data. The memory device 100 is operated in response to the control of the memory controller 200. The memory device 100 may include a memory cell array including a plurality of memory cells which store data. The memory cell array may include a plurality of memory blocks. Each memory block may include a plurality of memory cells. One memory block may include a plurality of pages. In an embodiment, each page may be a unit by which data is stored in the memory device 100 or by which data stored in the memory device 100 is read. A memory block may be a unit by which data is erased. In an embodiment, the memory device 100 may take many alternative forms and may include, for example, double data rate synchronous dynamic random access memory (DDR SDRAM), low power double data rate fourth generation (LPDDR4) SDRAM, graphics double data rate (GDDR) SDRAM, low power DDR (LPDDR) SDRAM, Rambus dynamic random access memory (RDRAM), NAND flash memory, vertical NAND flash memory, NOR flash memory device, resistive RAM (RRAM), phase-change RAM (PRAM), magnetoresistive RAM (MRAM), ferroelectric RAM (FRAM), or spin transfer torque RAM (STT-RAM). In the present specification, for convenience of description, a description will be made on the assumption that the memory device 100 uses NAND flash memory.

The memory device 100 may receive a command and an address from the memory controller 200, and may access the area of the memory cell array, selected by the address. That is, the memory device 100 may perform an operation indicated by the command on the area selected by the address. For example, the memory device 100 may perform a write operation (i.e., program operation), a read operation, and an erase operation. During a program operation, the memory device 100 may program data to the area selected by the address. During a read operation, the memory device 100 may read data from the area selected by the address. During an erase operation, the memory device 100 may erase data stored in the area selected by the address.

The memory controller 200 controls the overall operation of the storage device 50.

When power is applied to the storage device 50, the memory controller 200 may run firmware (FW). When the memory device 100 is a flash memory device, the memory controller 200 may run firmware such as a flash translation layer (FTL) for controlling communication between the host and the memory device 100.

In an embodiment, the memory controller 200 may receive data and a logical block address (LBA) from the host, and may translate the logical block address (LBA) into a physical block address (PBA) indicating the address of memory cells which are included in the memory device 100 and in which data is to be stored.

The memory controller 200 may control the memory device 100 so that a program operation, a read operation or an erase operation is performed in response to a request received from the host. During a program operation, the memory controller 200 may provide a program command, a physical block address (PBA), and data to the memory device 100. During a read operation, the memory controller 200 may provide a read command and a physical block address (PBA) to the memory device 100. During an erase operation, the memory controller 200 may provide an erase command and a physical block address (PBA) to the memory device 100.

In an embodiment, the memory controller 200 may internally generate a program command, an address, and data regardless of a request from the host, and may transmit them to the memory device 100. For example, the memory controller 200 may provide commands, addresses, and data to the memory device 100 so as to perform background operations, such as a program operation for wear leveling and a program operation for garbage collection.

In an embodiment, the memory controller 200 may control at least two memory devices 100. In this case, the memory controller 200 may control the memory devices 100 depending on an interleaving scheme to improve operating performance.

The host may communicate with the storage device 50 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

In an embodiment of the present disclosure, the memory controller 200 may include an operation controller 210 and a power controller 220.

The operation controller 210 may provide memory operation commands OP CMDs for instructing memory operations to an operation processor 131. The memory operation commands OP CMDs may include any one of a read command, a write command, and an erase command.

The power controller 220 may provide peak power setting commands (Power Setting CMDs) for setting a plurality of peak power periods and identifications (IDs) respectively corresponding to the plurality of peak power periods to a power management information storage 132. The power controller 220 may provide a peak power operation command (Peak Power OP mode CMD) to the power management information storage 132. The peak power operation command (Peak Power OP mode CMD) may be a command for determining whether each memory device 100 is to be operated during a peak power period based on peak power information and assigned ID information. The power controller 220 may provide an ID assignment command for assigning the ID of each memory device 100 to the power management information storage 132.

Each memory device 100 may include the operation processor 131 and the power management information storage 132. The power management information storage 132 may include an ID information storage 132*a* and a peak period information storage 132*b*.

The operation processor 131 may control the corresponding memory device 100 to perform a memory operation in response to the memory operation commands OP CMDs. The operation processor 131 may request peak power information from the power management information storage 132 when the memory operation commands OP CMDs are received. The operation processor 131 may control the corresponding memory device 100 to perform a memory operation at peak power during a target period corresponding to the assigned ID based on the peak power information received from the power management information storage 132.

The power management information storage 132 may store the peak power information in the peak period information storage 132*b* in response to the peak power setting commands (Power Setting CMDs). The power management information storage 132 may store the ID information, assigned in response to the ID assignment command, in the ID information storage 132*a*. The power management information storage 132 may provide the peak power information to the operation processor 131 in response to a peak power information request received from the operation processor 131.

Figure 2:
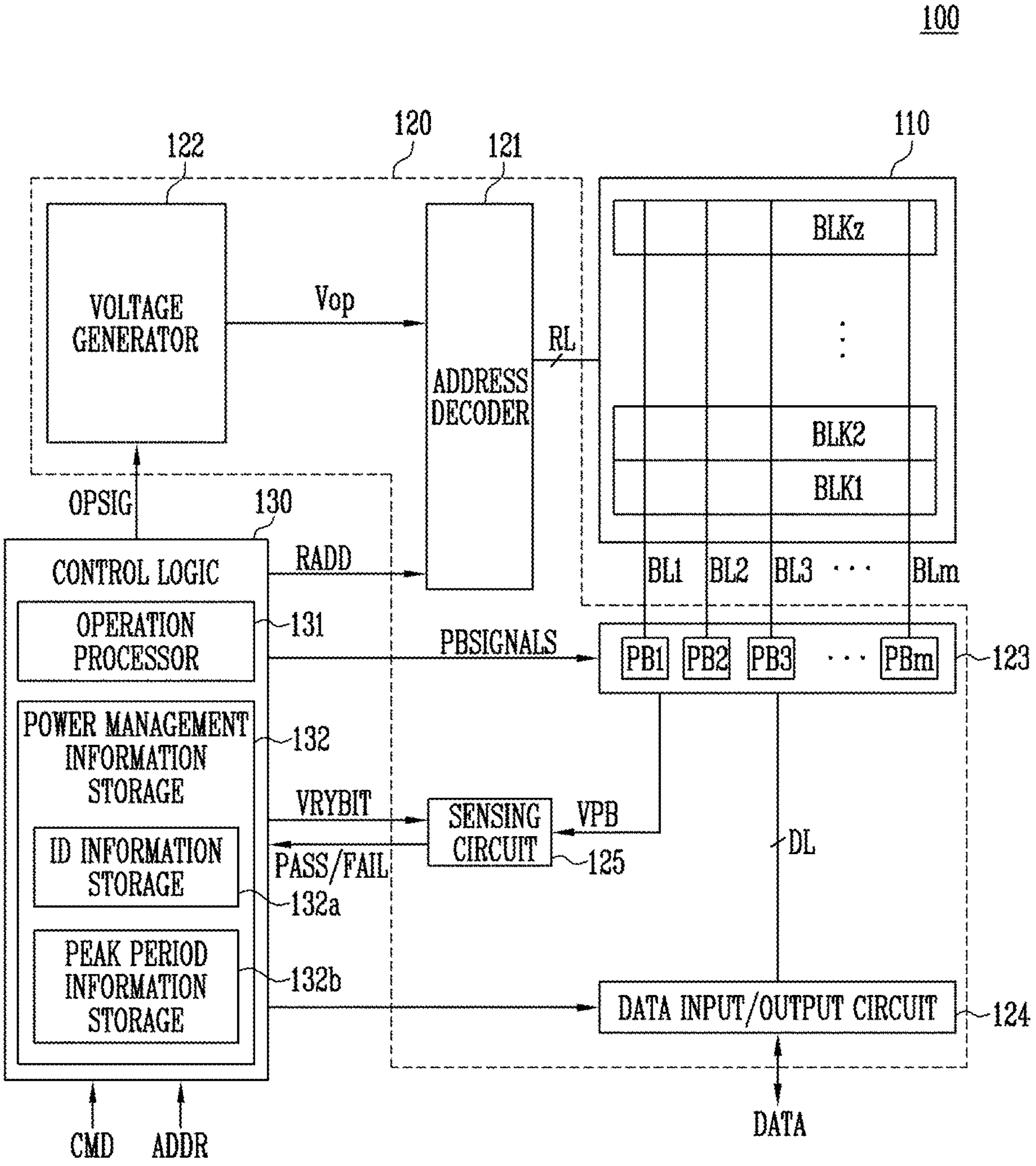
FIG. 2 is a diagram illustrating the structure of a memory device of FIG. 1.

FIG. 2 is a diagram illustrating the structure of the memory device of FIG. 1.

Referring to FIG. 2, the memory device 100 may include a memory cell array 110, a peripheral circuit 120, and control logic 130.

The memory cell array 110 includes a plurality of memory blocks BLK1 to BLKz. The plurality of memory blocks BLK1 to BLKz may be coupled to an address decoder 121 through row lines RL. The memory blocks BLK1 to BLKz may be coupled to a read and write circuit 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line, among the plurality of memory cells, are defined as one physical page. In other words, the memory cell array 110 may include a plurality of pages.

Each of the memory cells of the memory device 100 may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

The peripheral circuit 120 may include the address decoder 121, a voltage generator 122, the read and write circuit 123, a data input/output circuit 124, and a sensing circuit 125.

The peripheral circuit 120 may drive the memory cell array 110. For example, the peripheral circuit 120 may drive the memory cell array 110 so as to perform a program operation, a read operation, and an erase operation.

The address decoder 121 is coupled to the memory cell array 110 through the row lines RL. The row lines RL may include drain select lines, word lines, source selection lines, and a common source line. In accordance with an embodiment of the present disclosure, the word lines may include normal word lines and dummy word lines. In accordance with an embodiment of the present disclosure, the row lines RL may further include a pipe select line.

The address decoder 121 may be operated under the control of the control logic 130. The address decoder 121 receives addresses ADDR from the control logic 130.

The address decoder 121 may decode a block address, among the received addresses ADDR. The address decoder 121 selects at least one of the memory blocks BLK1 to BLKz according to the decoded block address. The address decoder 121 may decode a row address, among the received addresses ADDR. The address decoder 121 may select at least one word line of the selected memory block by applying voltages supplied from the voltage generator 122 to the at least one word line according to the decoded row address.

During a program operation, the address decoder 121 may apply a program voltage to the selected word line and apply a pass voltage lower than the program voltage to unselected word lines. During a program verify operation, the address decoder 121 may apply a verify voltage to the selected word line and apply a verify pass voltage higher than the verify voltage to the unselected word lines.

During a read operation, the address decoder 121 may apply a read voltage to the selected word line and apply a read pass voltage higher than the read voltage to the unselected word lines.

In accordance with an embodiment of the present disclosure, an erase operation of the memory device 100 is performed on a memory block basis. During an erase operation, the addresses ADDR input to the memory device 100 include a block address. The address decoder 121 may decode the block address and select one memory block according to the decoded block address. During the erase operation, the address decoder 121 may apply a ground voltage to word lines coupled to the selected memory block.

In accordance with an embodiment of the present disclosure, the address decoder 121 may decode a column address, among the received addresses ADDR. The decoded column address may be transferred to the read and write circuit 123. In an embodiment, the address decoder 121 may include components, such as a row decoder, a column decoder, and an address buffer.

The voltage generator 122 may generate a plurality of voltages using an external supply voltage that is supplied to the memory device 100. The voltage generator 122 may be operated under the control of the control logic 130.

In an embodiment, the voltage generator 122 may generate an internal supply voltage by regulating the external supply voltage. The internal supply voltage generated by the voltage generator 122 is used as an operating voltage for the memory device 100.

In an embodiment, the voltage generator 122 may generate the plurality of voltages using the external supply voltage or the internal supply voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include a plurality of pumping capacitors for receiving the internal supply voltage so as to generate a plurality of voltages having various voltage levels, and may generate the plurality of voltages by selectively enabling the plurality of pumping capacitors under the control of the control logic 130.

The generated voltages may be supplied to the memory cell array 110 by the address decoder 121.

The read and write circuit 123 includes first to m-th page buffers PB1 to PBm. The first to m-th page buffers PB1 to PBm are coupled to the memory cell array 110 through the first to m-th bit lines BL1 to BLm, respectively. The first to m-th page buffers PB1 to PBm are operated under the control of the control logic 130.

The first to m-th page buffers PB1 to PBm perform data communication with the data input/output circuit 124. During a program operation, the first to m-th page buffers PB1 to PBm receive data DATA to be stored through the data input/output circuit 124 and data lines DL.

During a program operation, the first to m-th page buffers PB1 to PBm may transfer the data DATA to be stored, received through the data input/output circuit 124, to selected memory cells through the bit lines BL1 to BLm when a program pulse is applied to a selected word line. Memory cells in a selected page are programmed based on the received data DATA. Memory cells coupled to a bit line to which a program permission voltage (e.g., a ground voltage) is applied may have increased threshold voltages. The threshold voltages of memory cells coupled to a bit line to which a program inhibit voltage (e.g., a supply voltage) is applied may be maintained. During a program verify operation, the first to m-th page buffers PB1 to PBm read the data DATA stored in the selected memory cells from the selected memory cells through the bit lines BL1 to BLm.

During a read operation, the read and write circuit 123 may read data DATA from the memory cells in the selected page through the bit lines BL1 to BLm, and may store the read data DATA in the first to m-th page buffers PB1 to PBm.

During an erase operation, the read and write circuit 123 may allow the bit lines BL1 to BLm to float. In an embodiment, the read and write circuit 123 may include a column select circuit.

The data input/output circuit 124 is coupled to the first to m-th page buffers PB1 to PBm through the data lines DL. The data input/output circuit 124 is operated in response to the control of the control logic 130.

The data input/output circuit 124 may include a plurality of input/output buffers (not illustrated) which receive input data DATA. During a program operation, the data input/output circuit 124 receives the data DATA to be stored from an external controller (not illustrated). During a read operation, the data input/output circuit 124 outputs the data DATA, received from the first to m-th page buffers PB1 to PBm included in the read and write circuit 123, to the external controller.

During a read operation or a verify operation, the sensing circuit 125 may generate a reference current in response to an enable bit signal VRYBIT generated by the control logic 130, and may output a pass or fail signal PASS/FAIL to the control logic 130 by comparing a sensing voltage VPB received from the read and write circuit 123 with a reference voltage generated by the reference current.

The control logic 130 may be coupled to the address decoder 121, the voltage generator 122, the read and write circuit 123, the data input/output circuit 124, and the sensing circuit 125. The control logic 130 may control the overall operation of the memory device 100. The control logic 130 may be operated in response to a command CMD transmitted from an external device.

The control logic 130 may control the peripheral circuit 120 by generating various types of signals in response to the command CMD and the addresses ADDR. For example, the control logic 130 may generate an operation signal OPSIG, a row address RADD, read and write control signals PBSIGNALS, and the enable bit VRYBIT in response to the command CMD and the addresses ADDR. The control logic 130 may output the operation signal OPSIG to the voltage generator 122, output the row address RADD to the address decoder 121, output the read and write control signal PBSIGNALS to the read and write circuit 123, and output the enable bit VRYBIT to the sensing circuit 125. In addition, the control logic 130 may determine whether a verify operation has passed or failed in response to the pass or fail signal PASS or FAIL output from the sensing circuit 125.

The control logic 130 may be implemented as hardware, software, or a combination of hardware and software. For example, the control logic 130 may be a control logic circuit operating in accordance with an algorithm and/or a processor executing control logic code. In an embodiment, the control logic 130 may include an operation processor 131 and a power management information storage 132. As used herein, "storage" may refer to a storage device or circuit. The power management information storage 132 may include an ID information storage **132*a* and a peak period information storage 132*b***.

The operation processor 131 may control the peripheral circuit 120 so that the memory device 100 performs a memory operation in response to a command CMD received from the memory controller. The operation processor 131 may request peak power information from the power management information storage 132 when a memory operation command CMD and an address ADDR are received. The operation processor 131 may receive information about a target period, corresponding to an assigned ID, which is included in the peak power information. The operation processor 131 may control the peripheral circuit 120 so that the memory device 100 performs a memory operation at peak power during the target period.

When a peak power setting command is received from the memory controller, the power management information storage 132 may store the peak power information in the peak period information storage 132*b*. The peak power information may include information about a plurality of peak power periods and information about IDs respectively corresponding to the plurality of the peak power periods. When an ID assignment command is received from the memory controller, the power management information storage 132 may store information about an assigned ID in the ID information storage 132*a*. The power management information storage 132 may provide the peak power information to the operation processor 131 in response to a peak power information request received from the operation processor 131. In detail, the power management information storage 132 may provide information about the target period corresponding to the assigned ID, which is included in the peak power information, to the operation processor 131.

Figure 3:
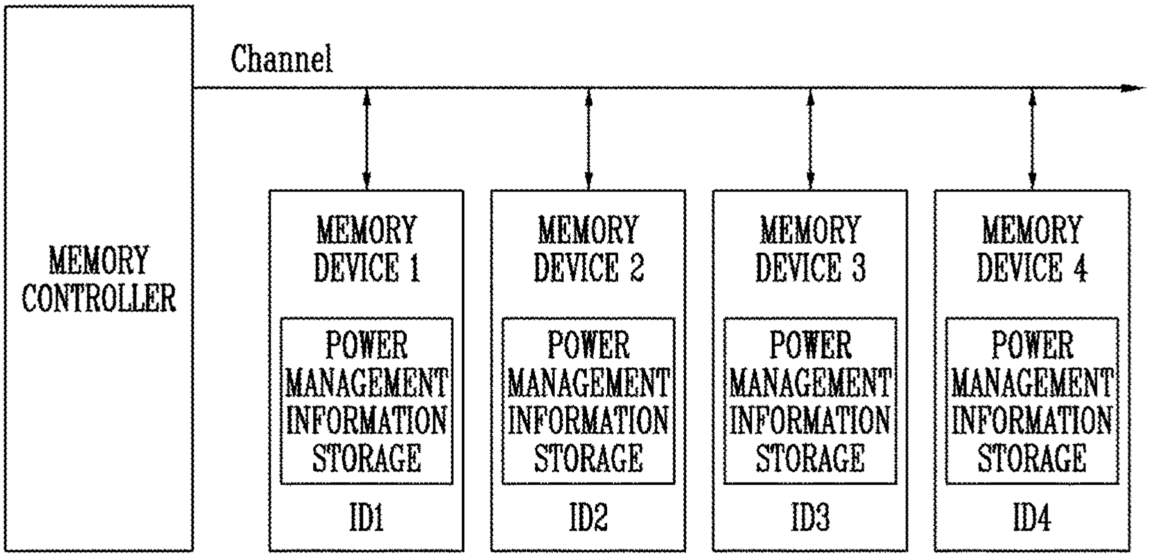
FIG. 3 is a diagram illustrating connection relationships between a memory controller and a plurality of memory devices.

FIG. 3 is a diagram illustrating connection relationships between a memory controller and a plurality of memory devices.

The memory controller may be coupled to a plurality of memory devices (memory device 1 to memory device 4) through one channel. The number of channels coupled to the memory controller and the number of memory devices coupled to each channel are not limited to the embodiment of the present disclosure.

The memory devices (memory devices 1 to 4) may be coupled in common to the channel. The memory devices may communicate with the memory controller through the channel.

Since the memory devices are coupled in common to one channel, only one memory device may communicate with the memory controller at one time. However, operations internally performed in respective memory devices may be performed in parallel.

For example, the memory controller may transmit control signals, including a command and an address, and data to the memory device 1 through the channel. While the memory device 1 is programming the received data to memory cells included therein, the memory controller may transmit control signals, including a command and an address, and data to the memory device 2.

Referring to FIGS. 1 and 3, each of the plurality of memory devices (memory devices 1 to 4) coupled to one channel may include a power management information storage 132.

The memory controller may provide peak power setting commands (Power Setting CMDs) for setting a plurality of peak power periods and IDs respectively corresponding to the peak power periods to the plurality of memory devices (memory device 1 to memory device 4), respectively, through the channel. Each of the plurality of memory devices (memory device 1 to memory device 4) may store peak power information, including information about the plurality of peak power periods and IDs respectively corresponding to the peak power periods, in the corresponding peak period information storage 132*b* in response to the peak power setting commands (Power Setting CMDs).

The memory controller may provide an ID assignment command to each of the plurality of memory devices (memory device 1 to memory device 4) through the channel. The power management information storage 132 included in each of the plurality of memory devices (memory device 1 to memory device 4) may store information about the ID assigned in response to the ID assignment command. Different IDs may be assigned to the plurality of memory devices (memory device 1 to memory device 4), respectively. In other embodiments, the same ID may be assigned to two or more of the plurality of memory devices.

The memory controller may provide memory operation commands OP CMDs for instructing memory operations to the plurality of memory devices (memory device 1 to memory device 4), respectively, through the channel. The operation commands may include at least one of a read command, a write command, and an erase command. Each memory device may perform a memory operation in response to the memory operation commands OP CMDs. The memory operations may be performed in parallel in the plurality of memory devices (memory device 1 to memory device 4), respectively.

The memory controller may provide a peak power operation command for instructing a peak power operation mode to be activated or deactivated to memory devices selected from among the plurality of memory devices. In response to the peak power operation command, the peak power operation mode of the selected memory devices may be activated. When the peak power operation mode is activated, the selected memory devices may perform a memory operation at peak power during a target period based on the peak power information when the memory operation is performed.

The plurality of memory devices (memory device 1 to memory device 4) coupled to one channel perform memory operations in parallel, thus improving the efficiency of the memory operations. However, in this case, periods during which the plurality of memory devices (memory device 1 to memory device 4) perform memory operations at peak power may overlap each other.

Figure 4A:
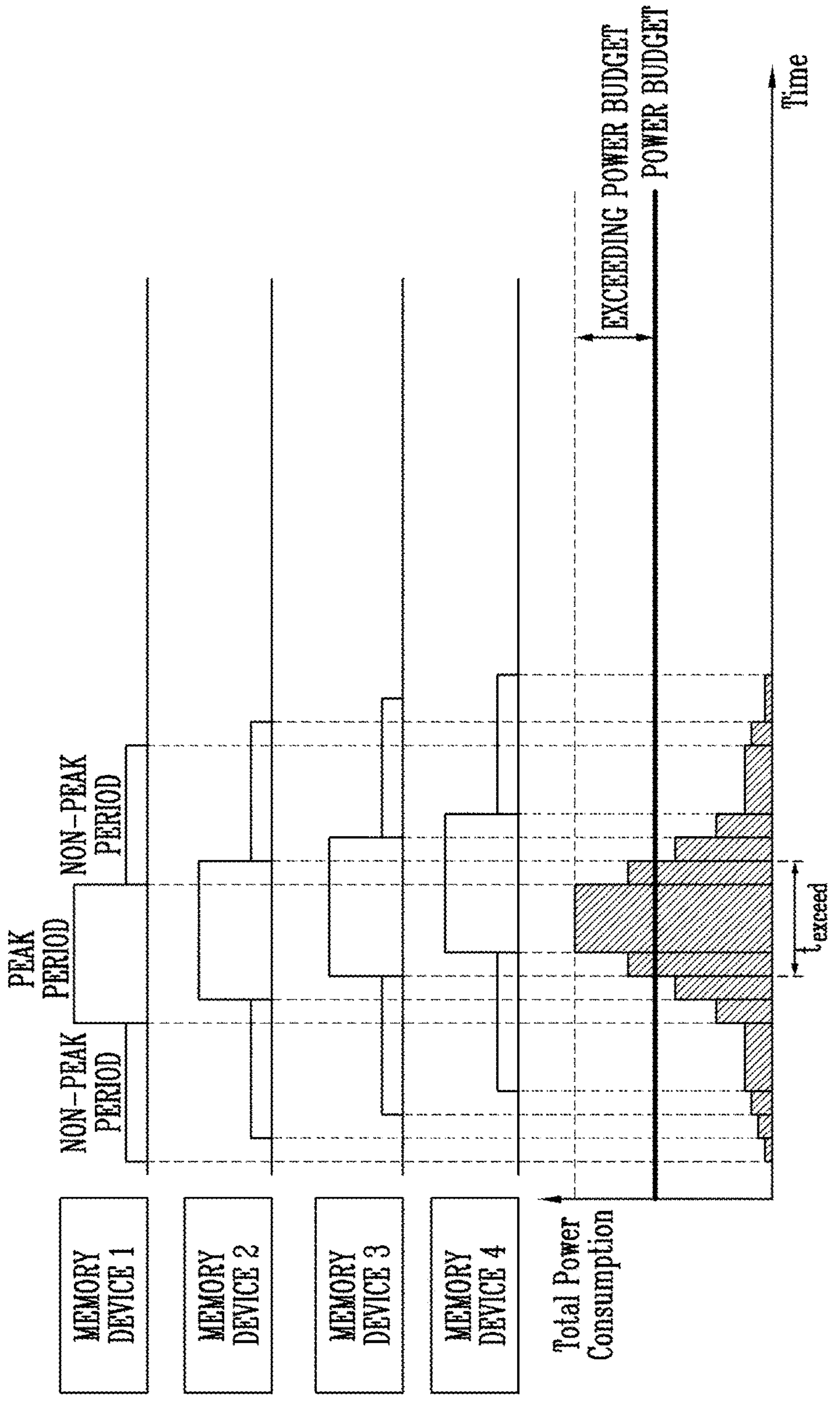
FIG. 4A is a diagram illustrating the case where total power consumption exceeds a power budget when periods during which a plurality of memory devices are operated at peak power overlap each other.

FIG. 4A is a diagram illustrating the case where total power consumption exceeds a power budget when periods during which a plurality of memory devices are operated at peak power overlap each other.

In FIG. 4A, a peak period may be a period during which the corresponding memory device performs a memory operation at peak power.

A non-peak period may be a period during which the corresponding memory device performs a memory operation at power lower than peak power.

Referring to FIG. 4A, a memory operation performed by each of the plurality of memory devices may include one or more periods during which the memory device is operated at peak power.

For example, in the case of a write operation, the memory device may be operated at peak power when a pass voltage or a program voltage is applied to a word line during a bit line precharge voltage apply period.

In the case of a read operation, the memory device may be operated at peak power when a pass voltage or a read voltage is applied to a word line during a bit line precharge voltage apply period.

In the case of an erase operation, the memory device may be operated at peak power when a precharge voltage is applied to a bit line or when an erase voltage is applied to a word line.

Referring to FIGS. 1, 3, and 4A, memory devices 1 to 4 may receive respective memory operation commands OP CMDs from the operation controller 210 of the memory controller and then perform memory operations. Because the memory devices 1 to 4 may perform the memory operations in parallel, periods (i.e., peak power operation periods) during which the memory devices 1 to 4 are operated at peak power may overlap each other. The periods during which the memory devices 1 to 4 are operated at peak power overlap each other, and thus total power consumption of the storage device may exceed a power budget of the storage device during a period texceed.

Figure 4B:
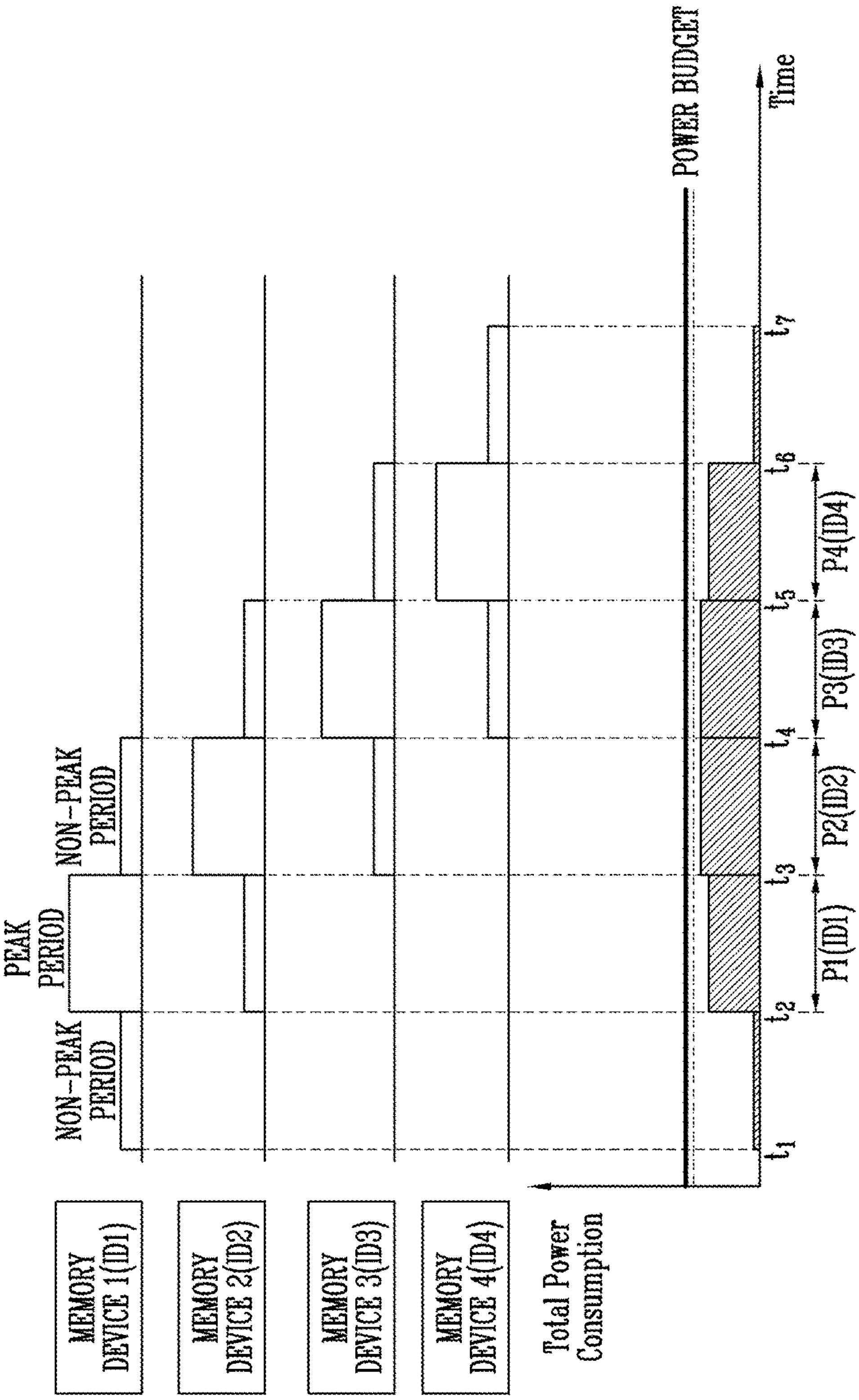
FIG. 4B is a diagram illustrating the case where a plurality of memory devices are operated at peak power according to an embodiment of the present disclosure.

FIG. 4B is a diagram illustrating the case where a plurality of memory devices are operated at peak power according to an embodiment of the present disclosure.

Referring to FIGS. 3 and 4B, the plurality of memory devices may perform memory operations at peak power during the same peak power period for respective assigned IDs.

A period from $t_2$ to $t_3$ may be set to a period P1. A period from $t_3$ to $t_4$ may be set to a period P2. A period from $t_4$ to $t_5$ may be set to a period P3. A period from $t_5$ to $t_6$ may be set to a period P4. The memory controller may set ID1 for the period P1, may set ID2 for the period P2, may set ID3 for the period P3, and set ID4 for the period P4. ID1 may be assigned to the memory device 1, ID2 may be assigned to the memory device 2, ID3 may be assigned to the memory device 3, and ID4 may be assigned to the memory device 4. Each of the plurality of memory devices may perform a memory operation at peak power during a peak power period corresponding to its own ID assigned thereto based on peak power information stored in the power management information storage.

For example, the period from time $t_2$ to $t_3$ may be the peak period of the memory device 1. When the peak period of the memory device 1 is terminated at time $t_3$, the memory device 2 may perform a memory operation at peak power.

The period from $t_3$ to $t_4$ may be the peak period of the memory device 2. When the peak period of the memory device 2 is terminated at time $t_4$, the memory device 3 may perform a memory operation at peak power.

The period from $t_4$ to $t_5$ may be the peak period of the memory device 3. When the peak period of the memory device 3 is terminated at time $t_5$, the memory device 4 may perform a memory operation at peak power.

A period from $t_5$ to $t_6$ may be the peak period of the memory device 4.

In accordance with the embodiment of FIG. 4B, the plurality of memory devices are managed such that peak periods thereof do not overlap each other, thus preventing the total power consumption of the plurality of memory devices from exceeding a power budget.

Figure 4C:
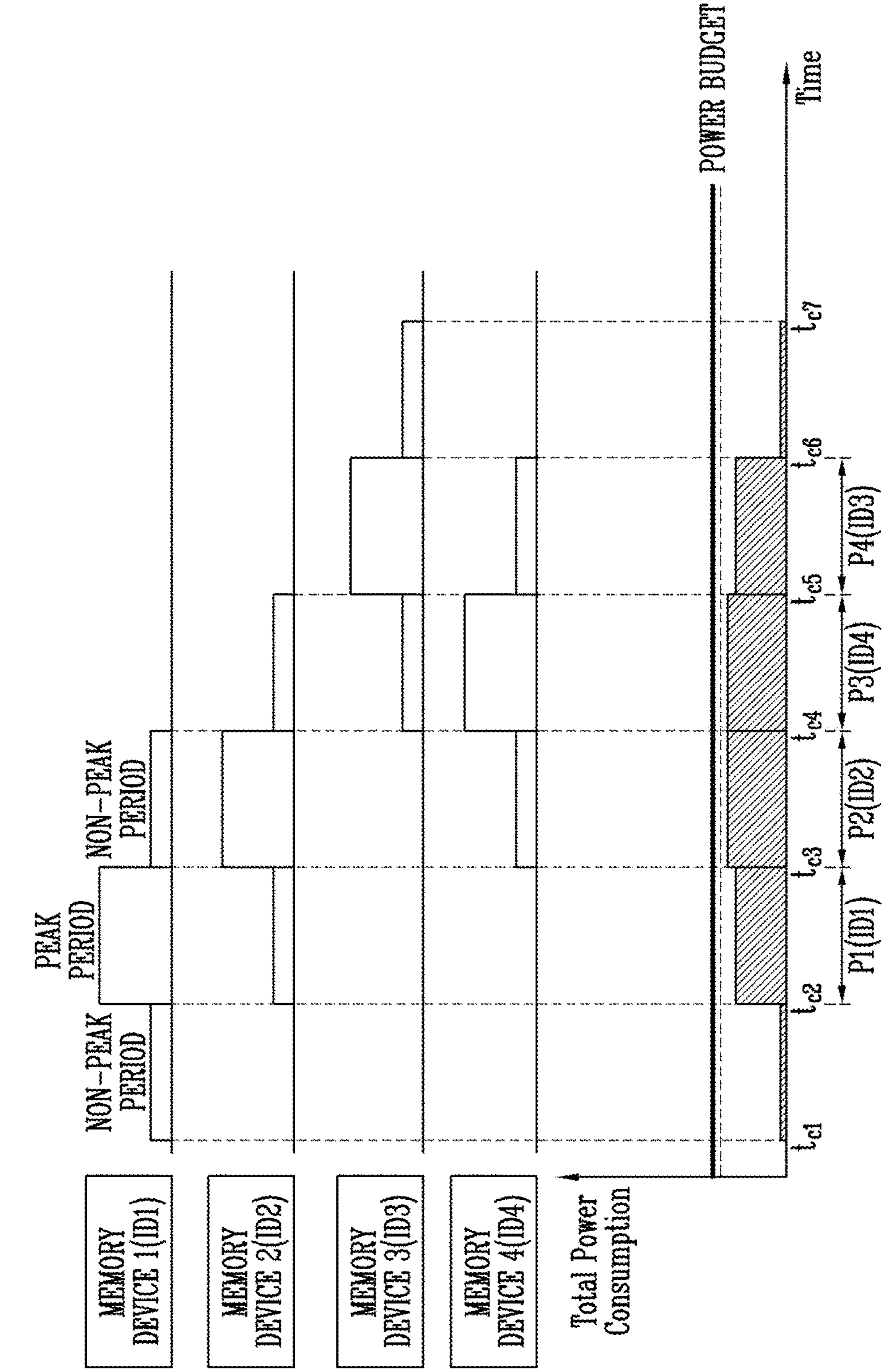
FIG. 4C is a diagram illustrating the case where a plurality of memory devices are operated at peak power according to an embodiment of the present disclosure.

FIG. 4C is a diagram illustrating the case where a plurality of memory devices are operated at peak power according to an embodiment of the present disclosure.

Referring to FIGS. 3 and 4C, a period from $t_{c2}$ to $t_{c3}$ may be set to a period P1. A period from $t_{c3}$ to $t_{c4}$ may be set to a period P2. A period from $t_{c4}$ to $t_{c5}$ may be set to a period P3. A period from $t_{c5}$ to $t_{c6}$ may be set to a period P4. The memory controller may set ID1 for the period P1, may set ID2 for the period P2, set ID4 for the period P3, and set ID3 for the period P4. ID1 may be assigned to the memory device 1, ID2 may be assigned to the memory device 2, ID3 may be assigned to the memory device 3, and ID4 may be assigned to the memory device 4. Each of the plurality of memory devices may perform a memory operation at peak power during a peak power period corresponding to its own ID assigned thereto based on peak power information stored in the power management information storage.

For example, the period from time $t_{c2}$ to $t_{c3}$ may be the peak period of the memory device 1. When the peak period of the memory device 1 is terminated at time $t_{c3}$, the memory device 2 may perform a memory operation at peak power.

The period from $t_{c3}$ to $t_{c4}$ may be the peak period of the memory device 2. When the peak period of the memory device 2 is terminated at time $t_{c4}$, the memory device 4 may perform a memory operation at peak power.

The period from $t_{c4}$ to $t_{c5}$ may be the peak period of the memory device 4. When the peak period of the memory device 4 is terminated at time $t_{c5}$, the memory device 3 may perform a memory operation at peak power.

The period from $t_{c5}$ to $t_{c6}$ may be the peak period of the memory device 3.

Figure 4D:
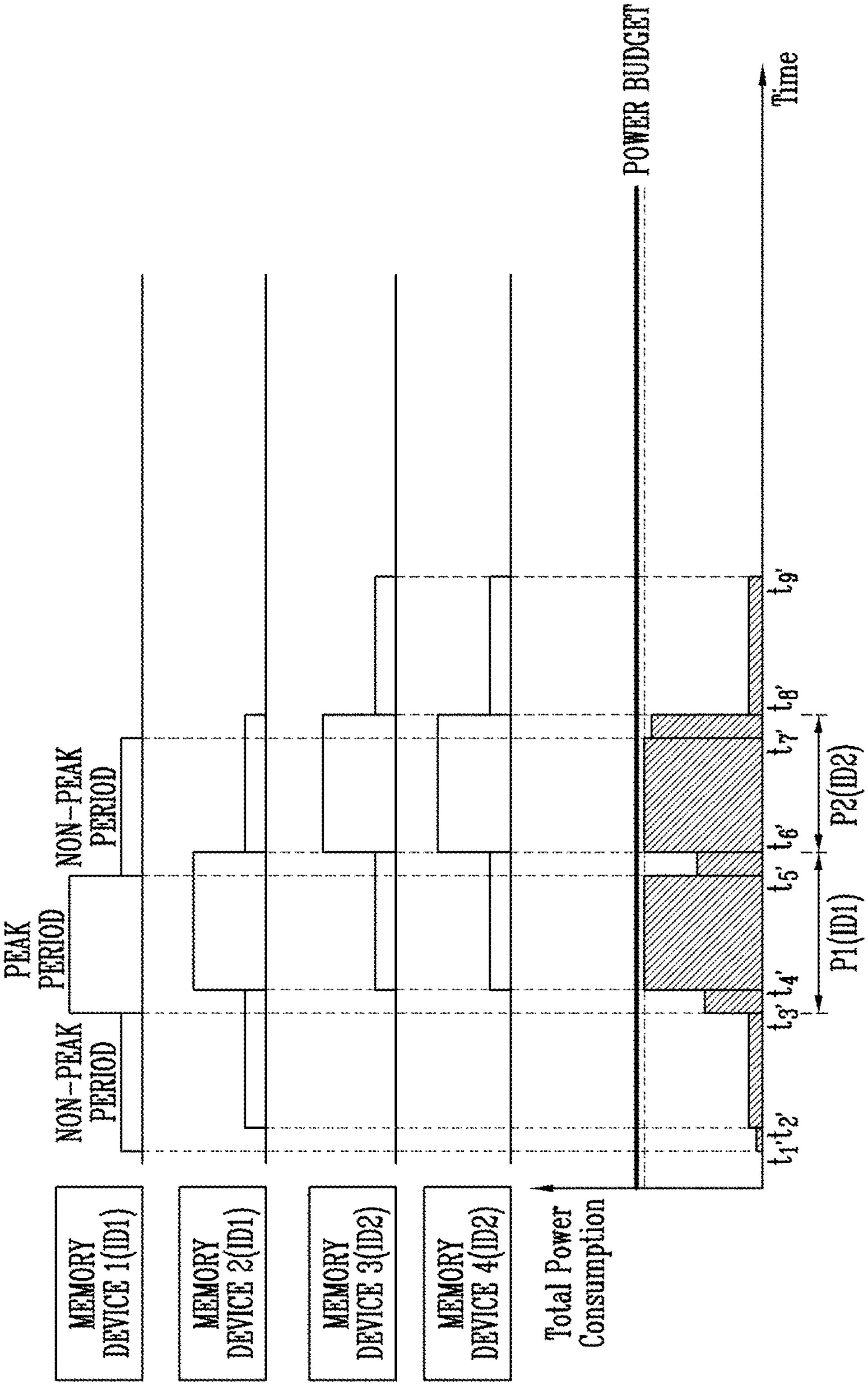
FIG. 4D is a diagram illustrating the case where a plurality of memory devices are operated at peak power when the same ID is assigned to at least two of the memory devices are assigned according to an embodiment of the present disclosure.

FIG. 4D is a diagram illustrating the case where a plurality of memory devices are operated at peak power when the same ID is assigned to at least two of the memory devices are assigned according to an embodiment of the present disclosure.

Referring to FIGS. 3 and 4D, the plurality of memory devices may perform memory operations at peak power during the same peak power period for respective assigned IDs.

A period from $t_{3'}$ to $t_{6'}$ may be set to a period P1. A period from $t_{6'}$ to $t_{8'}$ may be set to a period P2. The memory controller may set ID1 for the period P1, and may set ID2 for the period P2. ID1 may be assigned to the memory device 1 and the memory device 2, and ID2 may be assigned to the memory device 3 and the memory device 4. Each of the plurality of memory devices may perform a memory operation at peak power during a peak power period corresponding to its own ID assigned thereto based on peak power information stored in the power management information storage.

Since ID1 is assigned to the memory device 1 and the memory device 2, the memory devices 1 and 2 may perform memory operations at peak power during the period P1. Since ID2 is assigned to the memory device 3 and the memory device 4, the memory devices 3 and 4 may perform memory operations at peak power during the period P2.

For example, the period from $t_{3'}$ to $t_{5'}$ may be the peak period of the memory device 1. The memory device 2 may perform a memory operation at peak power at time $t_{4'}$.

A period from $t_{4'}$ to $t_{6'}$ may be the peak period of the memory device 2. When the peak period of the memory device 2 is terminated at time $t_{6'}$, the memory devices 3 and 4 may perform memory operations at peak power.

A period from $t_{6'}$ to $t_{8'}$ may be the peak period of the memory devices 3 and 4.

The number of the plurality of memory devices, the number of assigned IDs, and the number of peak power periods are not limited to the embodiments of the present disclosure. The number of the plurality of memory devices, the number of assigned IDs, and the number of peak power periods may be set to various values based on a power budget, the number of memory operations, etc. that are allowed by a system.

In accordance with the embodiments of FIGS. 4B, 4C, and 4D, each of the plurality of memory devices performs a memory operation during a period corresponding to the assigned ID based on the peak power information, thus efficiently performing the memory operation within the range of a power budget.

FIG. 5A is a diagram illustrating peak power information and ID information according to an embodiment of the present disclosure.

The memory controller may schedule peak power periods and the operations of memory devices during the respective peak power periods based on information about an allowable power budget of the storage device, the number of memory devices coupled to the memory controller through a channel, and memory operations performed by respective memory devices. The memory controller may provide a peak power setting command and an ID assignment command to each of the memory devices coupled to the memory controller based on the result of scheduling.

ID information may denote information about IDs assigned to a plurality of memory devices. IDs may be assigned to the plurality of memory devices, respectively. ID1 may be assigned to a memory device 1. ID2 may be assigned to a memory device 2. ID3 may be assigned to a memory device 3. ID4 may be assigned to a memory device 4.

The peak power information may include information about a plurality of peak power periods and information about IDs respectively corresponding to the plurality of the peak power periods.

In an embodiment of the present disclosure, a plurality of operation periods may include peak operation periods (i.e., peak power operation periods) P1 to P8. ID1 may correspond to the periods P1 and P5. ID2 may correspond to the period P2 and the period P6. ID3 may correspond to the periods P3 and P7. ID4 may correspond to the periods P4 and P8.

In accordance with an embodiment of the present disclosure, the memory device 1 assigned with ID1 may perform a memory operation at peak power during the periods P1 and P5. The memory device 2 assigned with ID2 may perform a memory operation at peak power during the periods P2 and P6. The memory device 3 assigned with ID3 may perform a memory operation at peak power during the periods P3 and P7. The memory device 4 assigned with ID4 may perform a memory operation at peak power during the periods P4 and P8.

FIG. 5B is a diagram illustrating peak power information and ID information according to an embodiment of the present disclosure.

In an embodiment of the present disclosure, ID1 may be assigned to a memory device 1. ID2 may be assigned to a memory device 2. ID3 may be assigned to a memory device 3. ID4 may be assigned to a memory device 4.

A plurality of operation periods may include peak operation periods P1 to P8. ID1 may correspond to the periods P1 and P8. ID2 may correspond to the periods P2 and P7. ID3 may correspond to the periods P3 and P6. ID4 may correspond to the periods P4 and P5.

In accordance with an embodiment of the present disclosure, the memory device 1 assigned with ID1 may perform a memory operation at peak power during the periods P1 and P8. The memory device 2 assigned with ID2 may perform a memory operation at peak power during the periods P2 and P7. The memory device 3 assigned with ID3 may perform a memory operation at peak power during the periods P3 and P6. The memory device 4 assigned with ID4 may perform a memory operation at peak power during the periods P4 and P5.

FIG. 5C is a diagram illustrating peak power information and ID information according to an embodiment of the present disclosure.

In an embodiment of the present disclosure, ID1 may be assigned to a memory device 1 and a memory device 2. ID2 may be assigned to a memory device 3 and a memory device 4.

A plurality of operation periods may include peak operation periods P1 to P6. ID1 may correspond to the periods P1, P3, and P4. ID2 may correspond to the periods P2, P5, and P6.

In accordance with an embodiment of the present disclosure, the memory devices 1 and 2 to which ID1 is assigned may perform memory operations at peak power during the periods P1, P3, and P4. The memory devices 3 and 4 to which ID2 is assigned may perform memory operations at peak power during the periods P2, P5, and P6.

As described above with reference to the embodiments of the present disclosure, the same ID may be assigned to two or more of the plurality of memory devices. The two or more memory devices assigned with the same ID may perform memory operations at peak power during peak power periods corresponding to the assigned ID.

The number of peak power periods, the number of IDs, and the number of memory devices according to the present disclosure are not limited to the embodiments of the present disclosure.

Figure 6:
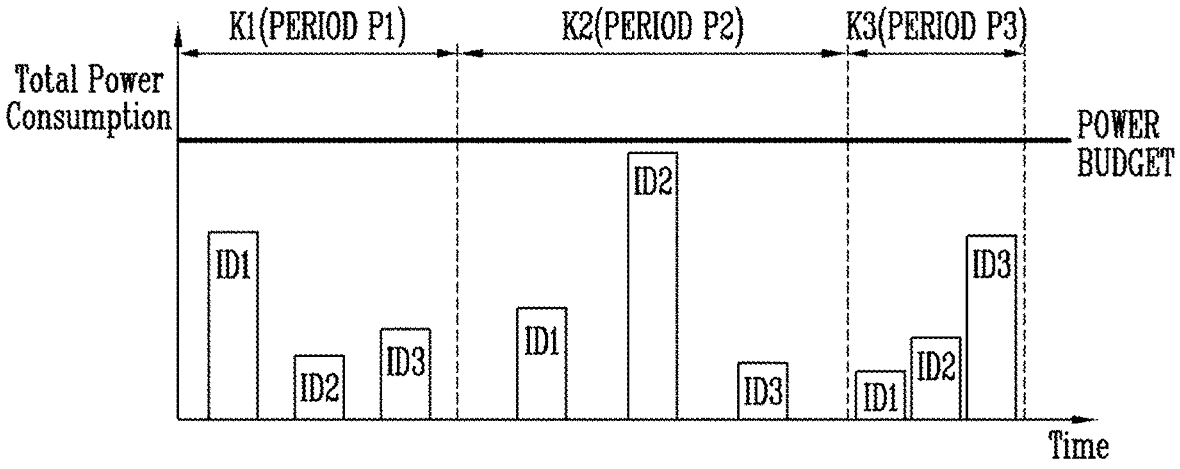
FIG. 6 is a diagram illustrating power consumption for each ID in each period according to an embodiment of the present disclosure.

FIG. 6 is a diagram illustrating power consumption for each ID in each period according to an embodiment of the present disclosure.

Referring to FIG. 6, memory devices may be set such that the memory devices assigned with ID1 are operated at peak power during the period P1, the memory devices assigned with ID2 are operated at peak power during the period P2, and the memory devices assigned with ID3 are operated at peak power during the period P3. Power consumed by the plurality of memory devices assigned with the same ID may vary with the number of memory devices, the types of memory operations respectively performed by the plurality of memory devices, or times during which the memory operations are performed. In an embodiment of the present disclosure, the length of the period P1 may be K1, the length of the period P2 may be K2, and the length of the period P3 may be K3. The memory controller may set the lengths of peak power periods to various values in consideration of power consumed by the plurality of memory devices assigned with the same ID and a power budget of the storage device. K1 to K3 may be set to different values.

Figure 7:
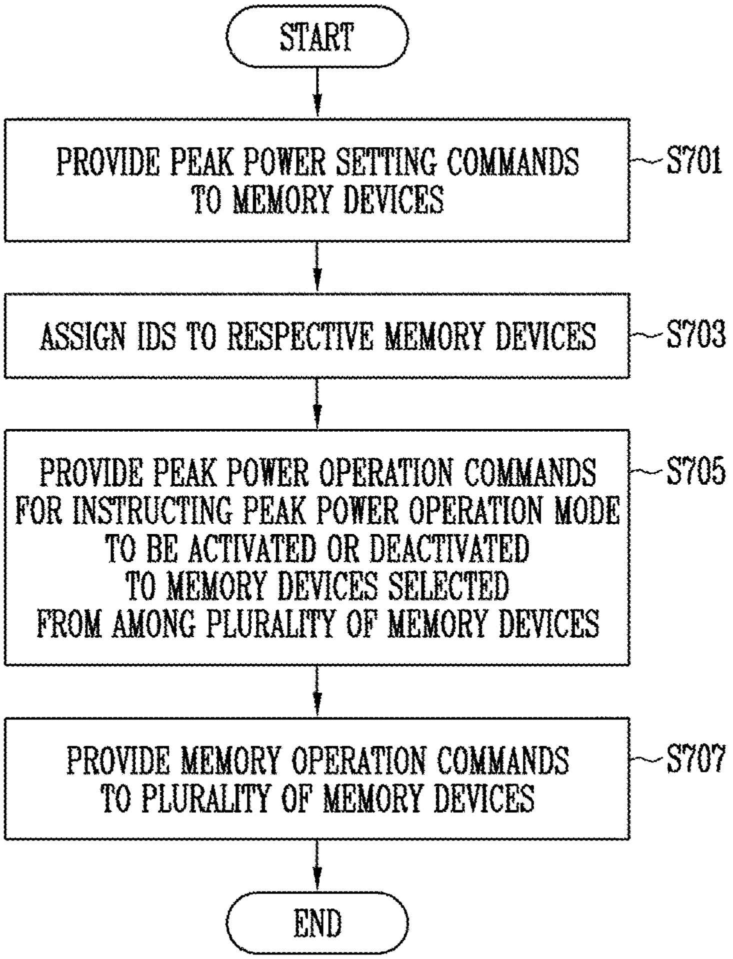
FIG. 7 is a flowchart illustrating the operation of a memory controller according to an embodiment of the present disclosure.

FIG. 7 is a flowchart illustrating the operation of a memory controller according to an embodiment of the present disclosure.

At step S701, the memory controller may provide peak power setting commands for setting peak power information to a plurality of memory devices, respectively. The peak power information may include information about a plurality of peak power periods and information about IDs respectively corresponding to the plurality of the peak power periods.

At step S703, the memory controller may assign IDs to the plurality of memory devices, respectively. Respective memory devices may be assigned with different IDs, and two or more memory devices may be assigned with the same ID.

At step S705, peak power operation commands for instructing a peak power operation mode to be activated or deactivated may be provided to memory devices selected from among the plurality of memory devices. The peak power operation commands may be commands that instruct the selected memory devices to perform memory operations during corresponding target periods based on the information stored in respective power management information storages.

At step S707, the memory controller may provide memory operation commands to the plurality of memory devices.

Figure 8:
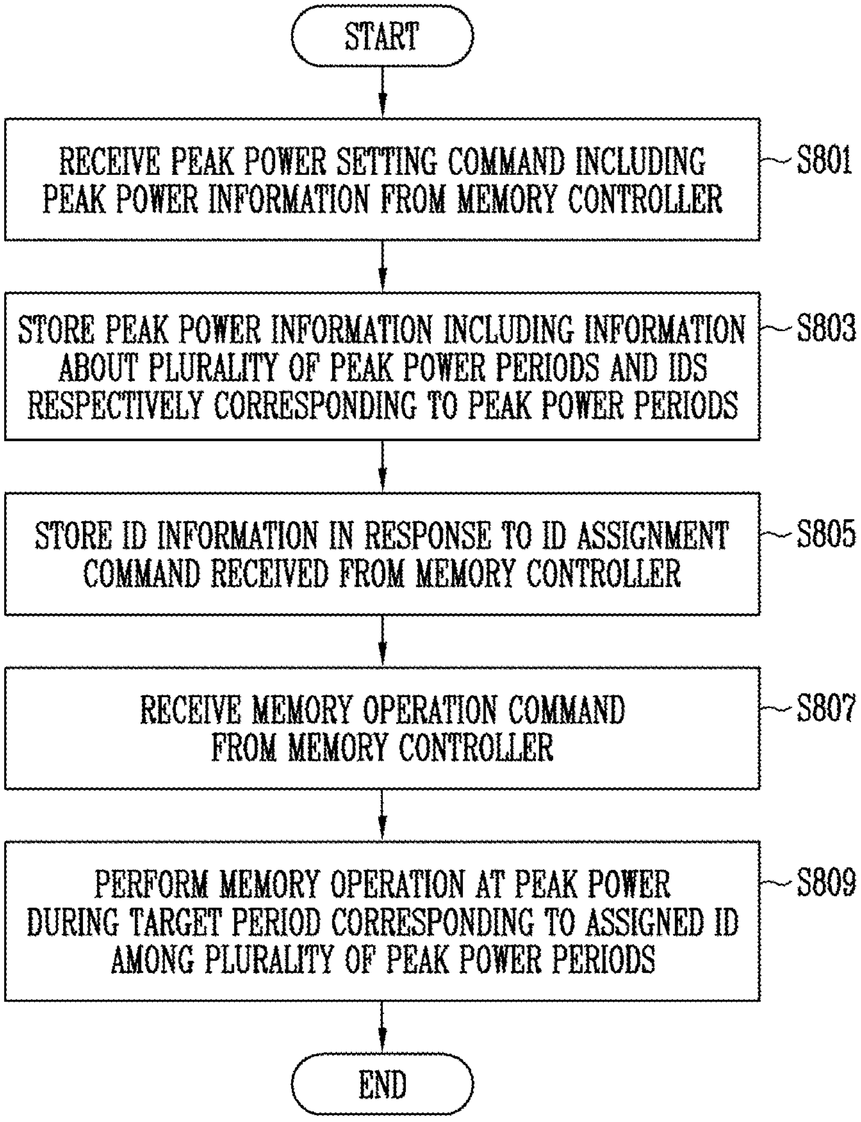
FIG. 8 is a flowchart illustrating the operation of a memory device according to an embodiment of the present disclosure.

FIG. 8 is a flowchart illustrating the operation of a memory device according to an embodiment of the present disclosure.

At step S801, the memory device may receive a peak power setting command including peak power information from the memory controller.

At step S803, the memory device may store peak power information that is received from the memory controller and that includes information about a plurality of peak power periods and IDs respectively corresponding to the peak power periods.

At step S805, the memory device may store ID information in response to an ID assignment command received from the memory controller.

At step S807, the memory device may receive a memory operation command from the memory controller.

At step S809, the memory device may perform a memory operation at peak power during a target period corresponding to the assigned ID, among the plurality of peak power periods.

Figure 9:
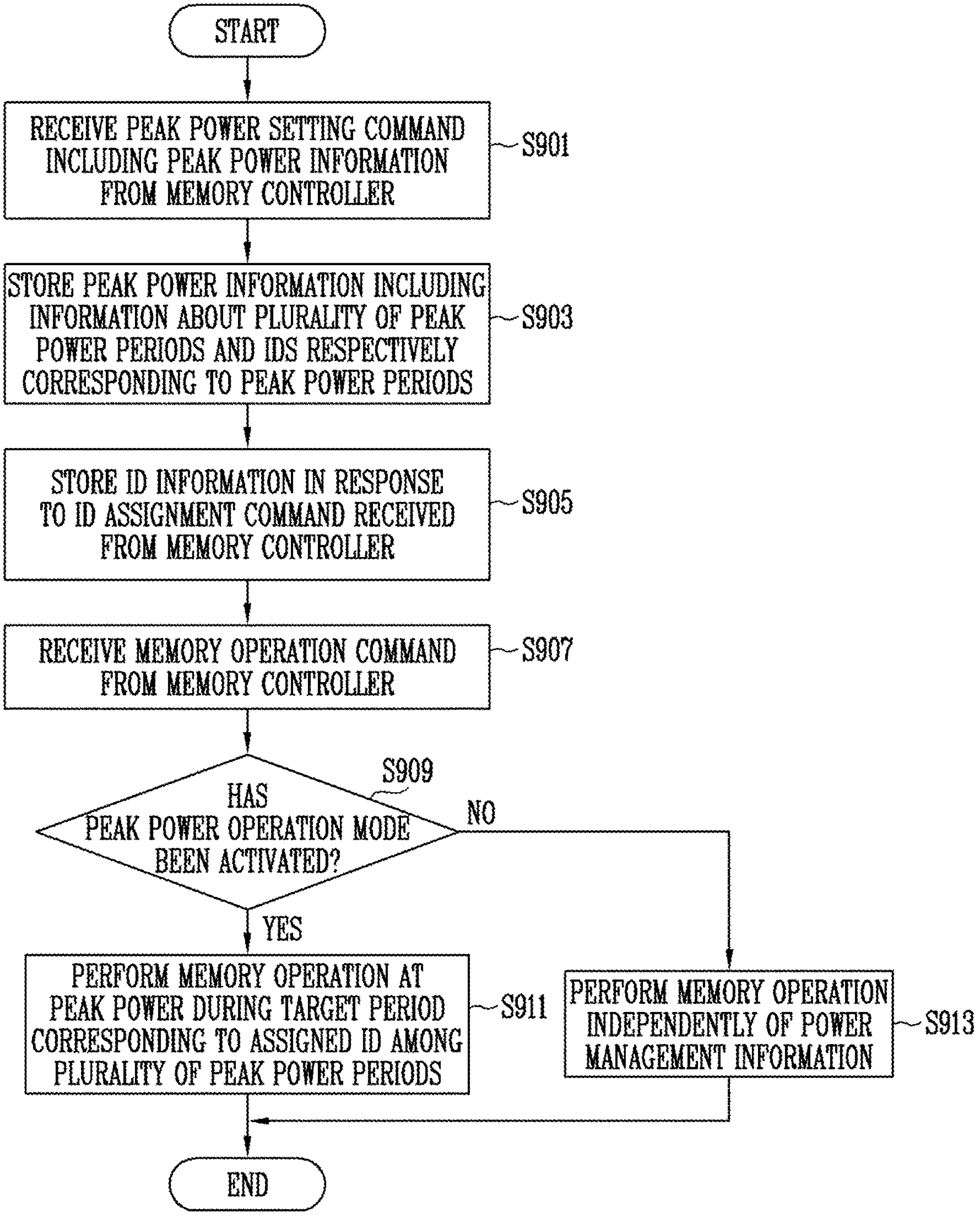
FIG. 9 is a flowchart illustrating the operation of a memory device according to an embodiment of the present disclosure.

FIG. 9 is a flowchart illustrating the operation of a memory device according to an embodiment of the present disclosure.

At step S901, the memory device may receive a peak power setting command including peak power information from the memory controller.

At step S903, the memory device may store peak power information that is received from the memory controller and that includes information about a plurality of peak power periods and IDs respectively corresponding to the peak power periods.

At step S905, the memory device may store ID information in response to an ID assignment command received from the memory controller.

At step S907, the memory device may receive a memory operation command from the memory controller.

At step S909, the memory device may determine whether a peak power operation mode has been activated.

At step S911, when it is determined that the peak power operation mode has been activated, the memory device may perform a memory operation at peak power during a target period corresponding to an assigned ID, among the plurality of peak power periods.

At step S913, when it is determined that a peak power operation mode has not been activated, the memory device may perform a memory operation independently of power management information stored in the power management information storage.

Figure 10:
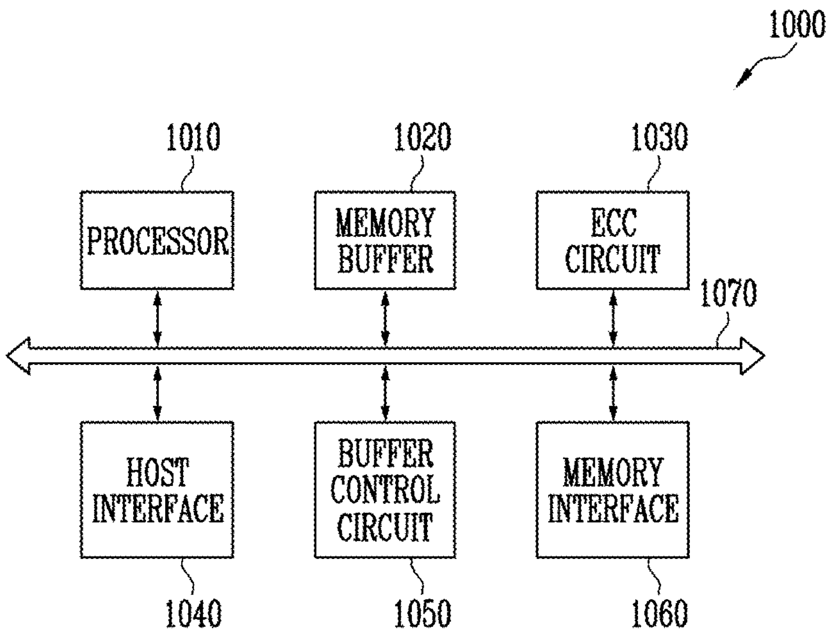
FIG. 10 is a diagram illustrating an embodiment of the memory controller of FIG. 1.

FIG. 10 is a diagram illustrating an embodiment of the memory controller 200 of FIG. 1.

Referring to FIG. 10, a memory controller 1000 is coupled to a host and a memory device. In response to a request received from the host, the memory controller 1000 may access the memory device. For example, the memory controller 1000 may be configured to control write, read, erase, and background operations of the memory device. The memory controller 1000 may provide an interface between the memory device and the host. The memory controller 1000 may run firmware for controlling the memory device.

The memory controller 1000 may include a processor 1010, a memory buffer 1020, an error correction circuit (Error Correction Code: ECC circuit) 1030, a host interface 1040, a buffer control circuit 1050, a memory interface 1060, and a bus 1070.

The bus 1070 may provide channels between components of the memory controller 1000.

The processor 1010 may control the overall operation of the memory controller 1000 and may perform a logical operation. The processor 1010 may communicate with an external host through the host interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory or a buffer memory.

The processor 1010 may perform the function of a flash translation layer (FTL). The processor 1010 may translate a logical block address (LBA), provided by the host, into a physical block address (PBA) through the FTL. The FTL may receive the LBA and translate the LBA into the PBA using a mapping table. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in the memory cell array.

The processor 1010 may derandomize data received from the memory device during a read operation. For example, the processor 1010 may derandomize the data received from the memory device using a derandomizing seed. The derandomized data may be output to the host.

In an embodiment, the processor 1010 may run software or firmware to perform randomizing and derandomizing operations.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include static RAM (SRAM) or dynamic RAM (DRAM).

The ECC circuit 1030 may perform error correction. The ECC circuit 1030 may perform error correcting code (ECC) encoding based on data to be written to the memory device through the memory interface 1060. The ECC-encoded data may be transferred to the memory device through the memory interface 1060. The ECC circuit 1030 may perform ECC decoding based on data received from the memory device through the memory interface 1060. In an example, the ECC circuit 1030 may be included as the component of the memory interface 1060 in the memory interface 1060.

The host interface 1040 may communicate with the external host under the control of the processor 1010. The host interface 1040 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not include the memory buffer 1020 and the buffer control circuit 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit control information such as commands or addresses in the memory controller 1000. The data bus and the control bus may be isolated from each other, and may neither interfere with each other nor influence each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 11:
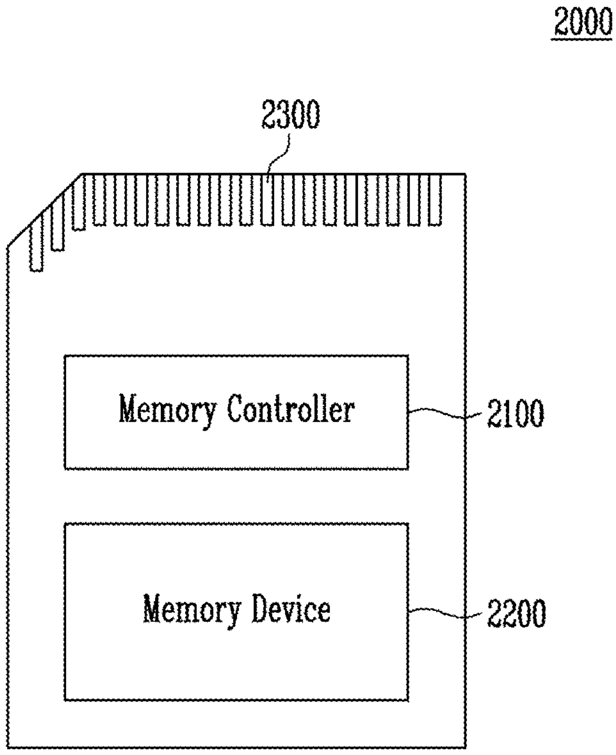
FIG. 11 is a block diagram illustrating a memory card system to which a storage device according to an embodiment of the present disclosure is applied.

FIG. 11 is a block diagram illustrating a memory card system to which the storage device according to an embodiment of the present disclosure is applied.

Referring to FIG. 11, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may be control read, write, erase, and background operations of the memory device 2200. The memory controller 2100 may provide an interface between the memory device 2200 and a host. The memory controller 2100 may run firmware for controlling the memory device 2200. The memory controller 2100 may be implemented in the same way as the memory controller 200 described above with reference to FIG. 1.

In an embodiment, the memory controller 2100 may include components, such as RAM, a processor, a host interface, a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, using, for example, Electrically Erasable and Programmable ROM (EEPROM), NAND flash memory, NOR flash memory, Phase-change RAM (PRAM), Resistive RAM (ReRAM), Ferroelectric RAM (FRAM), or Spin-Transfer Torque Magnetic RAM (STT-MRAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (personal computer memory card international association: PCMCIA), a compact flash card (CF), a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 12:
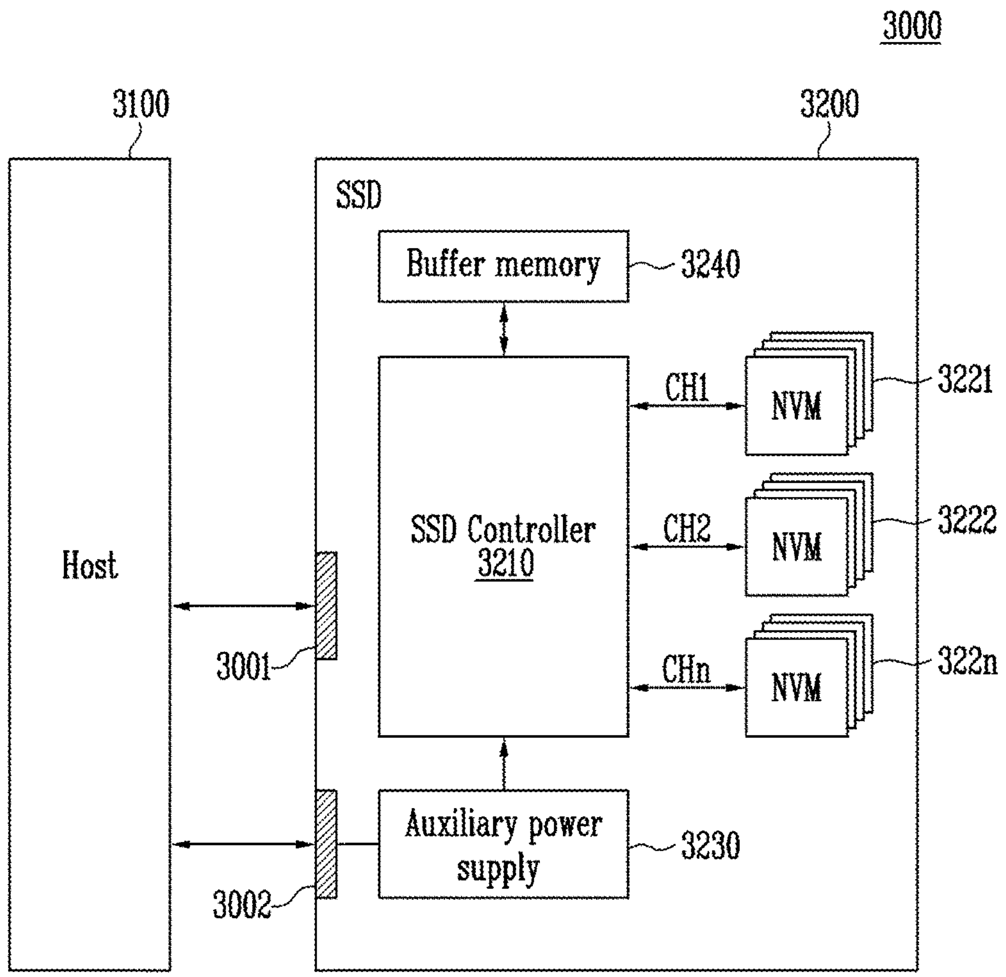
FIG. 12 is a block diagram illustrating a solid state drive (SSD) system to which a storage device according to an embodiment of the present disclosure is applied.

FIG. 12 is a block diagram illustrating a solid state drive (SSD) system to which the storage device according to an embodiment of the present disclosure is applied.

Referring to FIG. 12, an SSD system 3000 may include a host 3100 and an SSD 3200. The SSD 3200 may exchange signals with the host 3100 through a signal connector 3001 and may receive power PWR through a power connector 3002. The SSD 3200 may include an SSD controller 3210, a plurality of flash memories 3221 to **322*n*, an auxiliary power supply 3230, and a buffer memory 3240**.

In accordance with an embodiment of the present disclosure, the SSD controller 3210 may perform the function of the memory controller 200 described above with reference to FIG. 1.

The SSD controller 3210 may control the plurality of flash memories 3221 to **322*n* in response to the signals received from the host 3100. In an embodiment, the signals may be signals based on the interfaces of the host 3100 and the SSD 3200**. For example, the signals may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322*n* or may temporarily store metadata (e.g., mapping tables) of the flash memories 3221 to 322*n*. The buffer memory 3240 may include volatile memory such as DRAM, SDRAM, DDR SDRAM, LPDDR SDRAM, and GRAM or nonvolatile memory such as FRAM, ReRAM, STT-MRAM, and PRAM.

Figure 13:
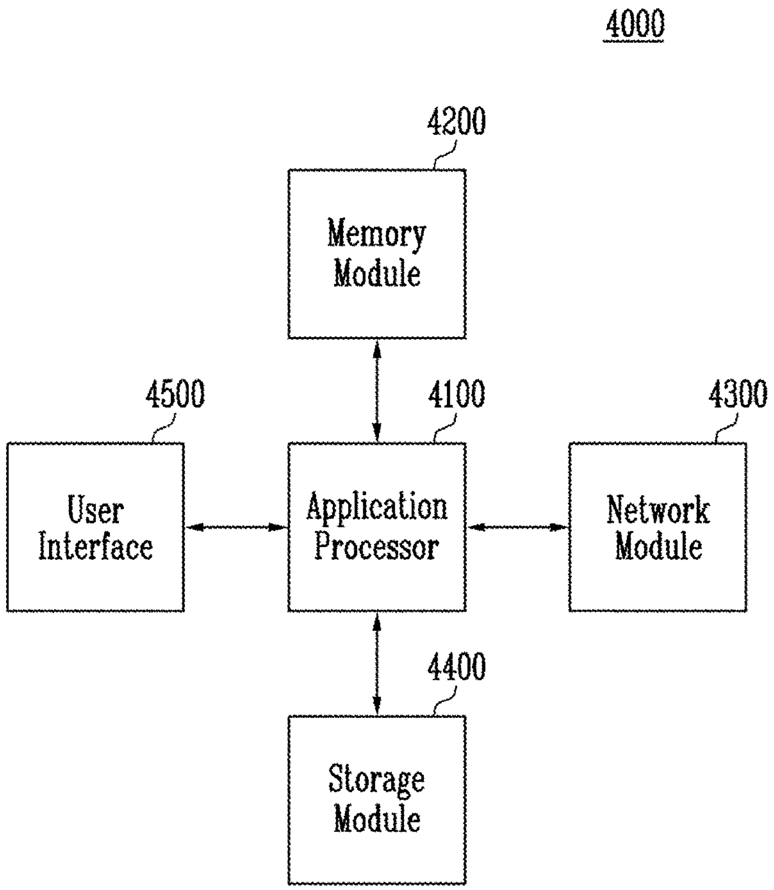
FIG. 13 is a block diagram illustrating a user system to which a storage device according to an embodiment of the present disclosure is applied.

FIG. 13 is a block diagram illustrating a user system to which the storage device according to an embodiment of the present disclosure is applied.

Referring to FIG. 13, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAM, such as DRAM, SDRAM, DDR SDRAM, DDR2 SDRAM, DDR3 SDRAM, LPDDR SDRAM, LPDDR2 SDRAM, and LPDDR3 SDRAM, or nonvolatile RAM, such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same way as the memory device 100 described above with reference to FIG. 1. The storage module 4400 may be operated in the same way as the storage device 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

In accordance with an embodiment of the present disclosure, there are provided a storage device having efficient power management performance and a method of operating the storage device.

What is claimed is:

1. A storage device, comprising:

a plurality of memory devices configured to store peak power information including information about a plurality of peak power periods and information about identifications (IDs) respectively corresponding to one or more peak power periods among the plurality of peak power periods, the plurality of memory devices are coupled to a memory controller through one channel; and the memory controller configured to assign a first ID among the IDs to a first memory device and a second memory device of the plurality of memory devices, provide a first memory operation command, instructing the first memory device to perform a first memory operation, to the first memory device through the one channel, and provide, while the first memory device performs the first memory operation, a second memory operation command, instructing the second memory device to perform a second memory operation, to the second memory device through the one channel, wherein the first memory device starts the first memory operation at a first time, performs the first memory operation at peak power during a target period, corresponding to the first ID, among the plurality of peak power periods, and performs the first memory operation at power lower than the peak power during a non-peak period other than the target period, and wherein the second memory device starts the second memory operation at a second time later than the first time, performs the second memory operation at the peak power during the target period, and performs the second memory operation at the power lower than the peak power during the non-peak period.

2. The storage device according to claim 1, wherein the memory controller is configured to provide a peak power setting command to set the plurality of peak power periods and the IDs to each of the plurality of memory devices.

3. The storage device according to claim 2, wherein the memory controller is configured to provide a peak power operation command to activate or deactivate a peak power operation mode to memory devices selected from among the plurality of memory devices.

4. The storage device according to claim 3, wherein each of the plurality of memory devices is configured to store the peak power information in response to the peak power setting command.

5. The storage device according to claim 4, wherein the first memory device and the second memory device are configured to, when the peak power operation mode is activated in response to the peak power operation command, perform the first memory operation and the second memory operation, respectively, at the peak power during the target period based on target period information, which indicates the target period and is included in the peak power information.

6. The storage device according to claim 1, wherein each of the first and second memory operations includes at least one of a read operation, a write operation, and an erase operation.

7. The storage device according to claim 1, wherein the memory controller is further configured to set a length of the target period based on power consumed by the first memory device and the second memory device and a power budget of the storage device.

8. The storage device according to claim 1, wherein the memory controller is further configured to set lengths of the plurality of peak power periods to be different from each other.

* * * * *